(12) United States Patent
Shinosaki et al.

(10) Patent No.: US 10,148,845 B2
(45) Date of Patent: Dec. 4, 2018

(54) UTILIZING DIFFERENT SPEED MEMORIES FOR MANAGING A PLURALITY OF USER USAGE DATA

(71) Applicant: Konica Minolta, Inc., Chiyoda-ku, Tokyo (JP)

(72) Inventors: Yusuke Shinosaki, Toyokawa (JP); Hiroaki Sugimoto, Nagoya (JP); Kazuhiro Tomiyasu, Toyokawa (JP); Tomoko Maruyama, Toyokawa (JP); Kazuaki Kanai, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 37 days.

(21) Appl. No.: 15/378,314

(22) Filed: Dec. 14, 2016

(65) Prior Publication Data

US 2017/0180590 A1 Jun. 22, 2017

(30) Foreign Application Priority Data

Dec. 17, 2015 (JP) ................................. 2015-246522

(51) Int. Cl.
*H04N 1/00* (2006.01)
*H04N 1/32* (2006.01)

(52) U.S. Cl.
CPC ........... *H04N 1/32101* (2013.01); *H04N 1/00* (2013.01); *H04N 1/0097* (2013.01);
(Continued)

(58) Field of Classification Search
None
See application file for complete search history.

(56) References Cited

U.S. PATENT DOCUMENTS 8,332,958 B2 * 12/2012 Nishimi ................. H04L 63/08
358/1.14
9,355,342 B2    5/2016 Nakatani et al.
(Continued)

FOREIGN PATENT DOCUMENTS

| CN | 1920830 A | 2/2007 |
|---|---|---|
| CN | 103458144 A | 12/2013 |
| JP | 2013-56515 A | 3/2013 |

OTHER PUBLICATIONS

The extended European Search Report dated May 2, 2017, by the European Patent Office in corresponding European Application No. 16204348.3. (11 pages).
(Continued)

*Primary Examiner* — Barbara Reinier
(74) *Attorney, Agent, or Firm* — Buchanan Ingersoll & Rooney PC

(57) ABSTRACT

An image forming apparatus capable of exchanging various types of information with at least one image forming apparatus includes a nonvolatile storage unit capable of higher-speed access processing than a hard disk drive of the image forming apparatus and capable of storing amount-of-use information regarding an amount of use of the image forming apparatus by each user, and a management unit configured to manage usage of the image forming apparatus by a user, by using the amount-of-use information stored in the storage unit. On a predetermined condition, the management unit shifts specific amount-of-use information to a shift destination device that is another image forming apparatus different from the image forming apparatus, the specific amount-of-use information being amount-of-use information about a specific user out of a plurality of pieces of amount-of-use information about each of a plurality of users stored in the storage unit.

23 Claims, 13 Drawing Sheets

(52) U.S. Cl.
CPC ..... *H04N 1/00347* (2013.01); *H04N 1/00395* (2013.01); *H04N 1/00832* (2013.01); *H04N 2201/0031* (2013.01); *H04N 2201/0032* (2013.01); *H04N 2201/0094* (2013.01); *H04N 2201/3202* (2013.01)

(56) References Cited

U.S. PATENT DOCUMENTS

| | | |
|---|---|---|
| 2006/0064738 A1 | 3/2006 | Hino et al. |
| 2006/0242112 A1 | 10/2006 | Hikita |
| 2007/0047973 A1 | 3/2007 | Lee |
| 2009/0059267 A1* | 3/2009 | Sato .................. H04N 1/00222 358/1.14 |
| 2013/0321866 A1 | 12/2013 | Nakatani et al. |
| 2015/0236725 A1* | 8/2015 | Reinart ................ H03M 13/35 714/774 |
| 2015/0347881 A1* | 12/2015 | Yoshida ............. G06K 15/1827 358/1.15 |
| 2018/0039452 A1* | 2/2018 | Nagamori ............. G06F 3/1203 |

OTHER PUBLICATIONS

Office Action (First Office Action) dated Aug. 3, 2018, by the Chinese Patent Office in corresponding Chinese Patent Application No. 201611145024.1, and an English Translation of the Office Action. (19 pages).

\* cited by examiner

Fig.7

|  | MFP10a | MFP10b | MFP10c | MFP10d | MFP10e |
|---|---|---|---|---|---|
| USER U1 | ○ |  |  |  |  |
| USER U2 | ○ | ○ |  |  |  |
| USER U3 |  | ○ |  |  | ○ |
| USER U4 | ○ |  | ○ |  |  |
| USER U5 |  |  |  | ○ |  |
| USER U6 | ○ | ○ |  |  | ○ |
| USER U7 |  |  |  | ○ |  |
| USER U8 |  |  |  | ○ |  |
| USER U9 | ○ | ○ | ○ | ○ | ○ |
| USER U10 |  | ○ |  |  |  |

*Fig.8*

|  | MFP10b | MFP10c | MFP10d | MFP10e |
|---|---|---|---|---|
| REMAINING REGISTERABLE NUMBER OF USERS | 2 | 30 | 22 | 19 |

|       | MFP10a | MFP10b | MFP10c | MFP10d | MFP10e |
|-------|--------|--------|--------|--------|--------|
| USER U1 | ○ | | | | |
| USER U2 | ○ | ○ | | | |
| USER U3 | | ○ | | | ○ |
| USER U4 | ○ | | ○ | | |
| USER U5 | ○ | | | ○ | |
| USER U6 | ○ | ○ | | | ○ |
| USER U7 | | | | ○ | |
| USER U8 | | | | ○ | |
| USER U9 | | ○ | ○ (MFP10c) / ○ (MFP10a) | ○ | ○ |
| USER U10 | | ○ | | | |

Fig.10

|  | MFP10a | MFP10b | MFP10c | MFP10d | MFP10e |
|---|---|---|---|---|---|
| USER U1 | 50 |  |  |  |  |
| USER U2 | 12 | 10 |  |  |  |
| USER U3 |  | 4 |  |  | 1 |
| USER U4 | 9 |  | 8 |  |  |
| USER U5 |  |  |  | 9 |  |
| USER U6 | 2 | 20 |  |  | 19 |
| USER U7 |  |  |  | 16 |  |
| USER U8 |  |  |  | 28 |  |
| USER U9 | 17 | 38 | 21 | 8 | 6 |
| USER U10 |  | 15 |  |  |  |

UTILIZING DIFFERENT SPEED MEMORIES FOR MANAGING A PLURALITY OF USER USAGE DATA

This application is based on Japanese Patent Application No. 2015-246522 filed on Dec. 17, 2015, the contents of which are hereby incorporated by reference.

BACKGROUND OF INVENTION

Technical Field

The present invention relates to an image forming apparatus such as a Multi-Functional Peripheral (MFP) and a technique related thereto.

Background Art

There are techniques for managing the usage of each image forming apparatus by users, without using any server, in an image forming system that includes multiple image forming apparatuses.

For example, Japanese Patent Application Laid-Open No. 2013-56515 discloses a technique in which in a cooperative system that includes multiple image forming apparatuses having a master-slave relationship, a master image forming apparatus collectively manages the usage of each image forming apparatus by each user. More specifically, the master image forming apparatus stores amount-of-use information regarding the amount of use of each image forming apparatus by each user (information regarding the amount of use of the image forming apparatus). When used by a user, a slave image forming apparatus acquires amount-of-use information about this user from the master image forming apparatus, and in response to execution of a job, returns the amount-of-use information to the master image forming apparatus.

However, in the image forming system without a server, the convenience of users may decrease if the amount-of-use information about all users is stored in only a single specific image forming apparatus (e.g., a mater image forming apparatus or an image forming apparatus at the top level in a hierarchical structure).

More specifically, in the case where the amount-of-use information about all users is stored in only a specific image forming apparatus, other image forming apparatuses, when used by login users, always perform processing for acquiring amount-of-use information about the login users from the specific image forming apparatus. Thus, for example if this image forming system is used by an extremely large number of users (e.g., ten thousand users or more), access concentration from a large number of image forming apparatuses occurs in the specific image forming apparatus. As a result, a relatively long time is required to acquire the amount-of-use information from the specific image forming apparatus due to the image forming apparatuses having lower throughput than servers, and the convenience of users decreases.

In order to avoid this problem, it is preferable in the image forming system used by a large number of users that each image forming apparatus stores the amount-of-use information about all users. This eliminates the need for each image forming apparatus to acquire the amount-of-use information from a specific image forming apparatus, and accordingly avoids a decrease in the convenience of users due to access concentration from each image forming apparatus occurring in the specific image forming apparatus.

However, as will be described below, there are circumstances that make it difficult to store the amount-of-use information about all users in each image forming apparatus.

More specifically, as the throughput speeds of the image forming apparatuses increase, there is demand for higher-speed access processing when accessing the amount-of-use information that is updated in every execution of a job. The amount-of-use information is thus preferably stored in high speed storages (e.g., flash memories) rather than in hard disk drives (HDDs) of the image forming apparatuses, the high speed storages being capable of higher-speed access processing than the HDDs. However, each image forming apparatus needs to be provided with a relatively large-capacity high speed storage in order to store the amount-of-use information about all users. This results in a considerable increase in cost.

Thus, although it is preferable in consideration of the convenience of users that each image forming apparatus stores the amount-of-use information about all users, this causes a considerable increase in cost in the image forming system used by an extremely large number of users.

SUMMARY OF INVENTION

It is an object of the present invention to provide a technique for managing the usage of image forming apparatuses by users while suppressing a decrease in the convenience of users as well as suppressing an increase in cost.

According to a first aspect of the present invention, an image forming apparatus capable of exchanging various types of information with at least one image forming apparatus, includes a nonvolatile storage unit capable of higher-speed access processing than a hard disk drive of the image forming apparatus and capable of storing amount-of-use information regarding an amount of use of the image forming apparatus by each user, and a management unit configured to manage usage of the image forming apparatus by a user, by using the amount-of-use information stored in the storage unit. On a predetermined condition, the management unit shifts specific amount-of-use information to a shift destination device that is another image forming apparatus different from the image forming apparatus, the specific amount-of-use information being amount-of-use information about a specific user, out of a plurality of pieces of amount-of-use information about each of a plurality of users stored in the storage unit.

According to a second aspect of the present invention, an image forming system includes a plurality of image forming apparatuses. One image forming apparatus out of the plurality of image forming apparatus includes a nonvolatile storage unit capable of higher-speed access processing than a hard disk drive of the one image forming apparatus and capable of storing amount-of-use information regarding an amount of use of the one image forming apparatus by each user, and a management unit configured to manage usage of the one image forming apparatus by a user, by using the amount-of-use information stored in the storage unit. On a predetermined condition, the management unit shifts specific amount-of-use information to a shift destination device that is another image forming apparatus different from the one image forming apparatus out of the plurality of image forming apparatuses, the specific amount-of-use information being amount-of-use information about a specific user out of a plurality of pieces of amount-of-use information about each of a plurality of users stored in the storage unit.

According to a third aspect of the present invention, a non-transitory computer-readable recording medium that records a program for causing a computer that is built into an image forming apparatus capable of exchanging various types of information with at least one image forming apparatus, to execute a) storing amount-of-use information regarding an amount of use of the image forming apparatus by each user in nonvolatile storage unit capable of higher-speed access processing than a hard disk drive of the image forming apparatus, and b) on a predetermined condition, shifting specific amount-of-use information to a shift destination device that is another image forming apparatus different from the image forming apparatus, the specific amount-of-use information being amount-of-use information about a specific user, out of a plurality of pieces of amount-of-use information about each of a plurality of users stored in the storage unit.

These and other objects, features, aspects and advantages of the present invention will become more apparent from the following detailed description of the present invention when taken in conjunction with the accompanying drawings.

BRIEF DESCRIPTION OF DRAWINGS

FIG. 7 illustrates an example showing the conditions of storage of counter information in each MFP (before shift processing).

FIG. 8 illustrates an example showing the remaining numbers of users registerable in the high speed storages of other MFPs.

FIG. 9 illustrates an example showing the conditions of storage of counter information in each MFP (after shift processing).

FIG. 10 illustrates an example showing the frequency of use of MFPs 10 by each user.

DETAILED DESCRIPTION OF PREFERRED EMBODIMENTS

Hereinafter, embodiments of the present invention will be described with reference to the drawings.

1. First Embodiment 1-1. Overview of Configuration

Figure 1:
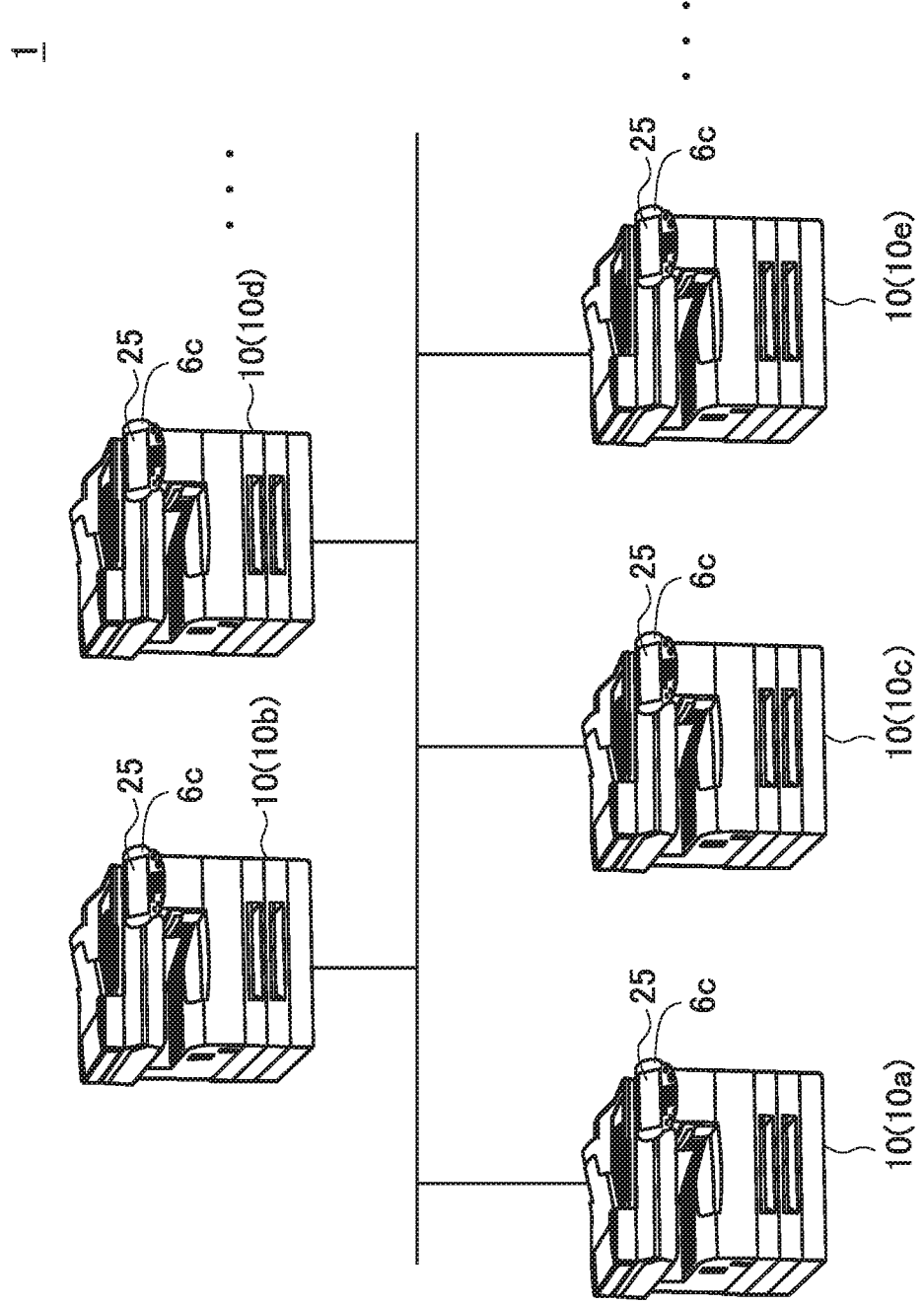
FIG. 1 illustrates an image forming system.

FIG. 1 illustrates an image forming system 1 according to the present invention. As illustrated in FIG. 1, the image forming system 1 includes multiple image forming apparatuses 10 (10a, 10b, 10c, and so on). The image forming system 1 does not include a server (external server) (i.e., a so-called serverless system). In the present embodiment, the image forming system 1 is constituted by a large number of image forming apparatuses 10 (e.g., approximately several hundred image forming apparatuses 10) and used by an extremely large number of users (e.g., ten thousand users). That is, the image forming system 1 is a relatively large-scale system.

In the image forming system 1, each image forming apparatus 10 manages the usage of the image forming apparatus 10 by each user, by using amount-of-use information regarding the amount of use of the image forming apparatus 10 by each user. On the basis of the usage, a billing amount to be charged to the user for use of the image forming apparatus 10 is calculated. To be more specific, counter information regarding a job performed by the image forming apparatus, such as the number of sheets printed out in a print job and(or) the number of sheets of an original document scanned (the number of sheets scanned) in a scan job, is managed by each image forming apparatus 10 and used as a basis to calculate a billing amount to be charged to each user for use of the image forming apparatus 10.

For example, when a user uses an image forming apparatus 10 to execute a print job, counter information about this user of this image forming apparatus 10 is updated in accordance with the number of sheets printed out in this print job (i.e., a value for the number of printed out sheets is added to the counter information).

As another example, when a user uses an image forming apparatus 10 to execute a scan job, counter information about this user of this image forming apparatus 10 is updated in accordance with the number of sheets scanned in this scan job (i.e., the value for the number of scanned sheets is added to the counter information).

Then, at the end of a predetermined period of time (target period of time for counting), the billing amount to be charged to that user for use of that image forming apparatus is calculated on the basis of the amount-of-use information (counter information) about that user.

In this way, in the image forming system 1, each image forming apparatus 10 manages the usage of the image forming apparatus 10 by each user, by using the counter information about the user of the image forming apparatus 10. The image forming system 1 is also referred to as a "billing system."

1-2. Configuration of Image Forming Apparatus

Figure 2:
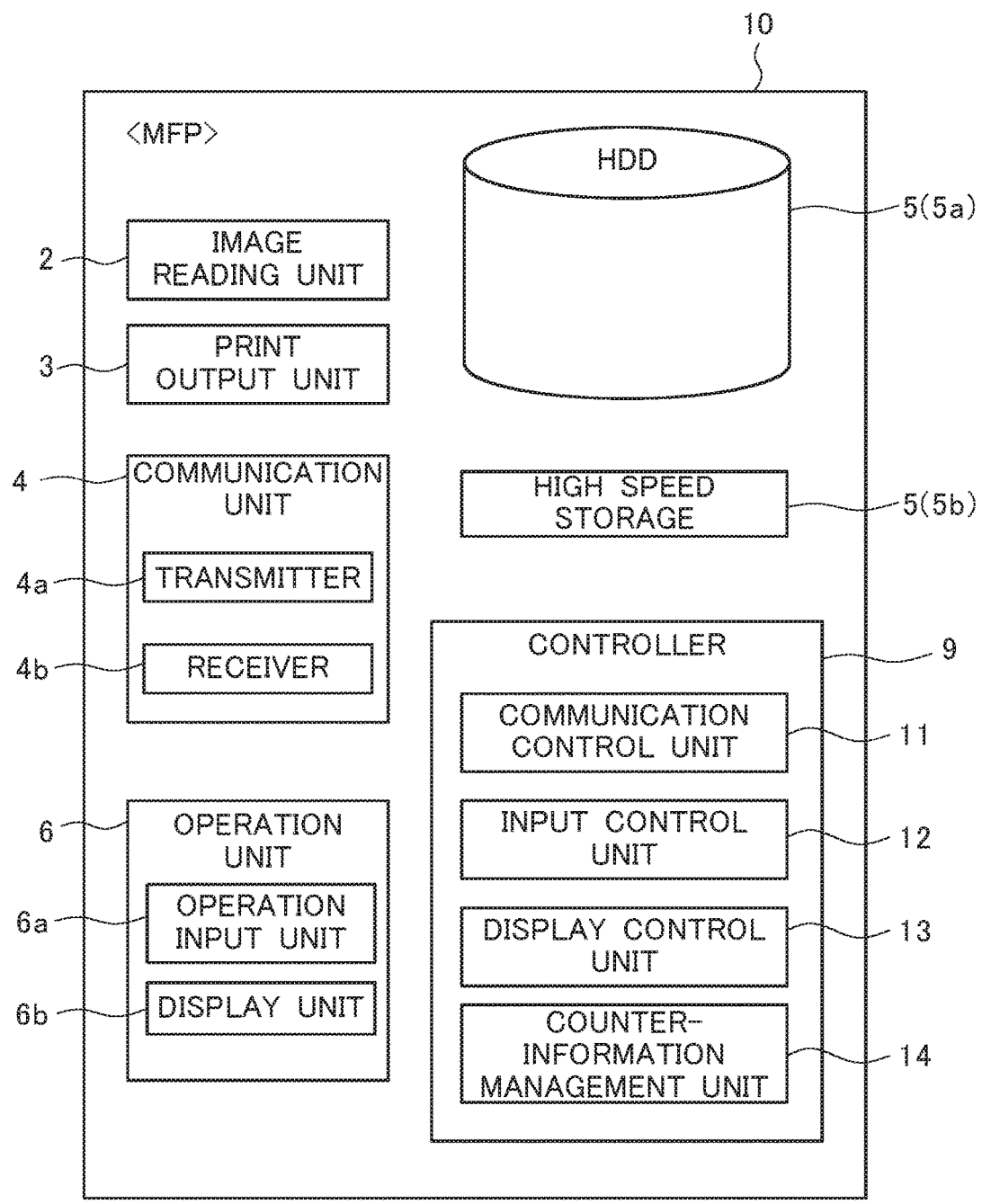
FIG. 2 illustrates functional blocks of an image forming apparatus (MFP).

FIG. 2 illustrates functional blocks of an image forming apparatus 10 (10a, 10b, 10c, and so on). Here, a Multi-Functional Peripheral (MFP) is used as an example of the image forming apparatus 10. FIG. 2 illustrates functional blocks of an MFP 10.

The MFP 10 is an apparatus (also referred to as a "Multi-Functional Peripheral") having functions such as a scan function, a copy function, a facsimile function, and a box storage function. More specifically, the MFP 10 includes, for example, an image reading unit 2, a print output unit 3, a communication unit 4, a storage unit 5 (5a, 5b), an operation unit 6, and a controller 9 as illustrated in the functional block diagram in FIG. 2, and implements various types of functions by operating these units in combination.

The image reading unit 2 is a processing unit that optically reads (i.e., scans) an original document that is placed at a predetermined position on the MFP 10 and generates image data of the original document (also referred to as an "original image" or a "scanned image"). The image reading unit 2 is also referred to as a "scanning unit."

The print output unit 3 is an output unit that prints out an image on various types of media such as paper on the basis of data regarding an object to be printed.

The communication unit 4 is a processing unit capable of facsimile communication via, for example, a public network. The communication unit 4 is also capable of network communication via a network. The network communication uses various types of protocols such as Transmission Control Protocol/Internet Protocol (TCP/IP). Using the network communication, the MFP 10 can exchange various types of information with desired parties (e.g., other MFPs 10). The communication unit 4 includes a transmitter 4*a* that transmits various types of data, and a receiver 4*b* that receives various types of data.

The MFP 10 includes two storage units 5 (5*a* and 5*b*).

Figure 3:
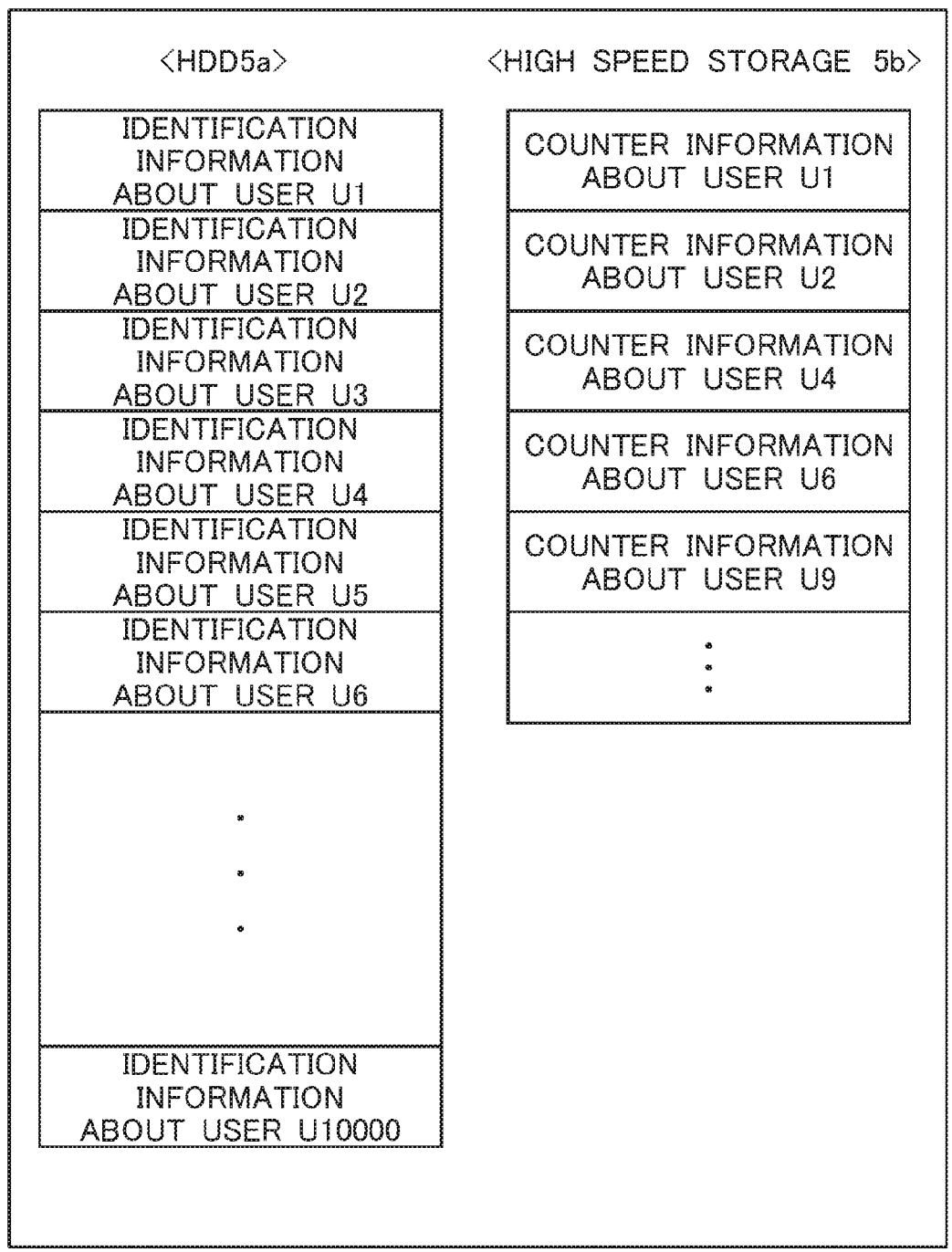
FIG. 3 is a conceptual diagram for describing identification information stored in an HDD and counter information stored in a high speed storage.

The storage unit 5*a* is configured by a large-capacity storage device such as a hard disk drive (HDD). The HDD 5*a* registers (stores) user identification information (e.g., user IDs and passwords) about all users (e.g., ten thousand users) who use the image forming system 1 (i.e., multiple MFPs 10 (10*a*, 10*b*, 10*c*, and so on)) (see also FIG. 3). The user identification information is used when the users log in to the MFPs 10.

The storage unit 5*b* is configured by a nonvolatile storage device such as a flash memory. Access processing (read processing and/or write processing) via the storage unit 5*b* is faster than access processing via the HDD5*a*, and the storage unit 5*b* is also referred to as a "high speed storage."

The high speed storage 5*b* of the MFP 10 sequentially registers (stores) counter information about users who have logged in to the MFP 10. For example, the high speed storage 5*b* of the MFP 10*a* registers counter information about users (e.g., users U1, U2, U4, and U9) who have logged in to the MFP 10*a*, in the order of login (in the present example, in order from user U1 to user U2, user U4, and user U9) (see also FIG. 3).

The high speed storage 5*b* has a smaller capacity than the HDD5*a*. More specifically, the high speed storage 5*b* (to be more specific, an area of the high speed storage 5*b* that is allocated as an area for storing the counter information) is capable of registering (storing) counter information about each of a predetermined number (e.g., several tens) of users, but incapable of registering (storing) counter information about all users of the MFP 10. In other words, the high speed storage 5*b* stores counter information about up to an upper limit number of users whose counter information can be stored in the high speed storage 5*b* (i.e., registerable number of users). That is, the high speed storage 5*b* is incapable of storing counter information about a larger number of users (extremely large number of users who use the MFP 10) than the predetermined number of users (registerable number of users), and stores counter information about each of the predetermined number of users.

The operation unit 6 includes an operation input unit 6*a* that accepts operation input to the MFP 10, and a display unit 6*b* that displays and outputs various types of information.

The MFP 10 is provided with a substantially plate-like operation panel unit 6*c* (see FIG. 1). The operation panel unit 6*c* includes a touch panel 25 (see FIG. 1) on the front side. The touch panel 25 functions not only as part of the operation input unit 6*a* but also as part of the display unit 6*b*. The touch panel 25 is configured by embedding, for example, various types of sensors in a liquid crystal display panel, and is capable of accepting various types of operation input from an operator while displaying various types of information.

The controller 9 is a control device that is built into the MFP 10 and performs overall control of the MFP 10. The controller 9 is configured as a computer system that includes, for example, a CPU and various types of semiconductor memories (RAMs and ROMs). The controller 9 implements various types of processing units by causing the CPU to execute predetermined software programs (hereinafter, also simply referred to as "programs") stored in a ROM (e.g., EEPROM (registered trademark)). The programs (to be more specific, a group of program modules) may be recorded in a portable recording medium (or in other words, any of various types of non-transitory computer-readable recording media) such as an USB memory and installed into the MFP 10 via the recording medium. Alternatively, the programs may be downloaded via, for example, a network and installed into the MFP 10.

More specifically, the controller 9 implements various types of processing units including a communication control unit 11, an input control unit 12, a display control unit 13, and a counter-information management unit 14 as illustrated in FIG. 2 by executing the programs.

The communication control unit 11 is a processing unit that controls communication operations with other devices (e.g., other MFPs 10) in cooperation with, for example, the communication unit 4. The communication control unit 11 includes a transmission control unit that controls operations of transmitting various types of data, and a reception control unit that controls operations of receiving various types of data. For example, the communication control unit 11 shifts (transmits) counter information about a specific user (specific counter information) to another MFP 10 (shift destination device) in cooperation with the communication unit 4 on the basis of an instruction received from the counter-information management unit 14. If the specific user again uses the MFP 10, the communication control unit 11 receives the specific counter information that has been shifted to the shift destination device, from the shift destination device.

The input control unit 12 is a control unit that controls operations of receiving input of operation to the operation input unit 6*a* (e.g., touch panel 25). For example, the input control unit 12 controls operations of accepting operation input to an operation screen displayed on the touch panel 25.

The display control unit 13 is a processing unit that controls operations of display on the display unit 6*b* (e.g., touch panel 25). The display control unit 13 causes the touch panel 25 to display screens such as an operation screen for operating the MFP 10.

The counter-information management unit 14 is a control unit that manages the usage of the MFP 10 by users, by using the amount-of-use information (counter information) about each user stored in the high speed storage 5*b*. For example, in response to execution of a job by a login user, the counter-information management unit 14 performs processing for updating the counter information about the login user. The counter-information management unit 14 also performs processing for registering (storing) the counter information about the login user. More specifically, the counter-information management unit 14 registers (stores) the counter information about the login user (directly) in the high speed storage 5*b* of the MFP 10 until a predetermined condition is satisfied (e.g., a condition that when the user has logged in to the MFP 10, the available space of the high speed storage 5*b* is less than a predetermined capacity). On the other hand, if the condition is satisfied, i.e., the available space of the high speed storage 5*b* is less than the predetermined capacity when the user has logged in to the MFP 10, the counter-information management unit 14 performs processing for shifting the specific counter information. To be more specific, the counter-information management unit 14 shifts specific counter information (counter information about a specific user other than the login user), out of multiple pieces of counter information stored in the high speed storage 5b, to another MFP 10. Then, the counter-information management unit 14 registers (stores) counter information about the login user in the high speed storage 5b of its own device.

1-3. Operations

In the present embodiment, the MFP 10 (e.g., MFP 10a) registers (stores) counter information about a login user in its high speed storage 5b as a rule. Thereafter, if the following condition is satisfied, i.e., the available space of the high speed storage 5b of the MFP 10a is less than a predetermined capacity when a user (e.g., user U5) has logged in to the MFP 10a, the MFP 10a shifts counter information about a specific user (e.g., user U9) of the MFP 10a to another MFP 10 (e.g., MFP 10c) (see FIGS. 4 and 5). Then, the MFP 10a newly registers counter information about the login user U5 in the high speed storage 5b of itself (MFP 10a) (see FIG. 5), and updates the counter information about the user U5 when the login user U5 has executed a job. In the present example, the counter information about each user of each MFP 10 is separately handled. For example, counter information about the user U9 of the MFP 10a (counter information about the user U9 made for the MFP 10a) and counter information about the user U9 of the MFP 10c (counter information about the user U9 made for the MFP 10c) are separately handled (see also FIG. 5).

Subsequently, for example if the user U9 whose counter information has been shifted to another MFP 10 (e.g., MFP 10c) again uses (logs in to) the MFP 10a, the MFP 10a acquires the counter information about the user U9 of itself (MFP 10a) (counter information about the user U9, which has been shifted to the MFP 10c) from the MFP 10c and again registers the acquired counter information in the MFP 10a.

Figure 6:
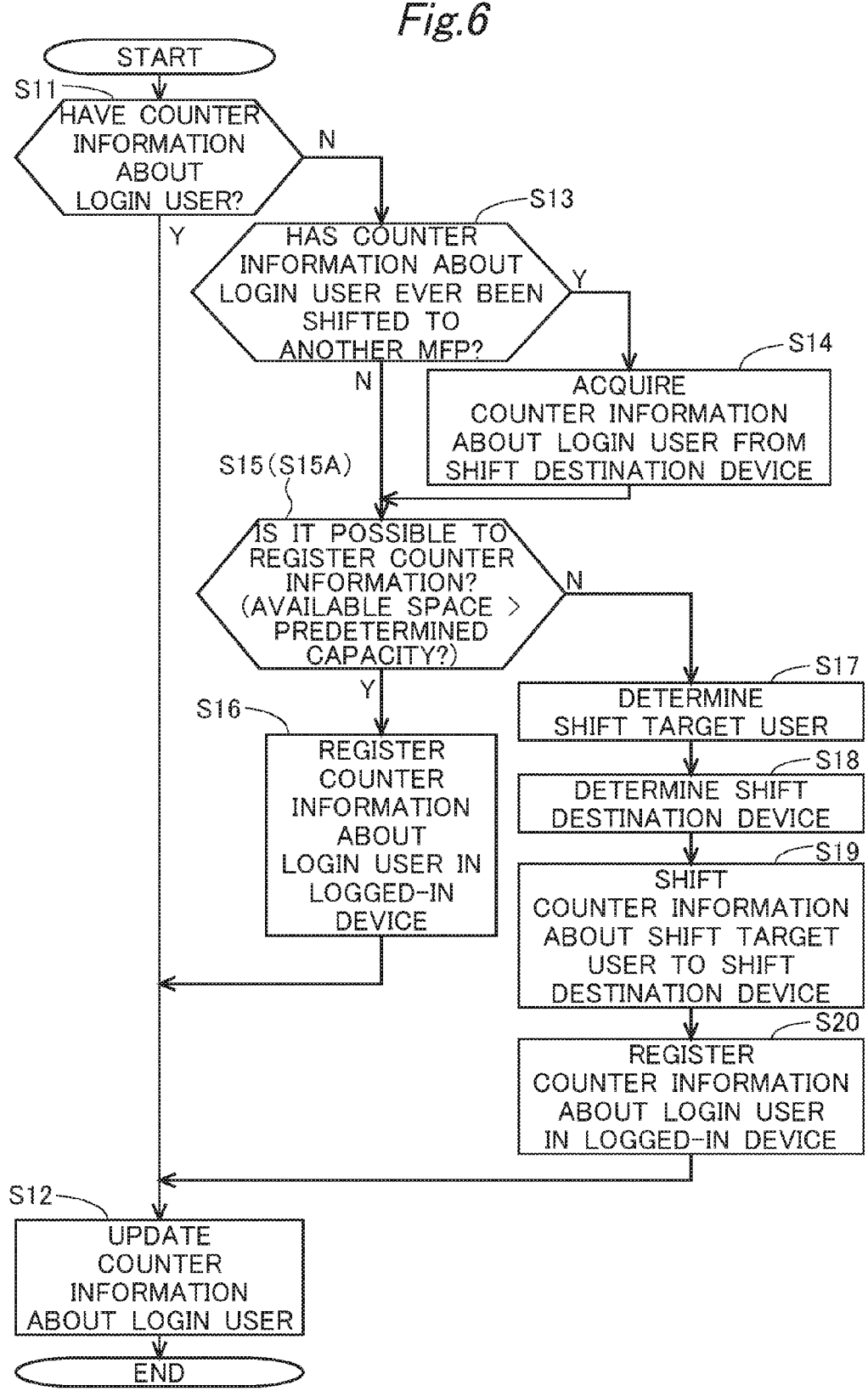
FIG. 6 illustrates a flowchart of operations performed by an MFP.

FIG. 6 illustrates a flowchart of operations performed by the MFP 10. If a user has logged in to the MFP 10 (e.g., MFP 10a) by inputting his or her own user identification information (e.g., user ID and password), the MFP 10 (MFP 10a) starts the operations illustrated in FIG. 6. Hereinafter, processing such as updating counter information, registering counter information, shifting counter information, and acquiring counter information will be described with reference to FIG. 6 and other figures. The operations in FIG. 6 are performed by each MFP 10 (MFPs 10a, 10b, 10c, and so on).

If a user has logged in to a device, the counter-information management unit 14 of the logged-in device, i.e., currently-used device, (here, MFP 10a) used by the login user determines whether the high speed storage 5b of the logged-in device (MFP 10a) has counter information about the login user of the logged-in device registered (stored) therein (step S11).

If it is determined that the high speed storage 5b of the logged-in device (MFP 10a) has the counter information about the login user of the MFP 10a registered (stored) therein, the procedure proceeds to step S12 to perform processing for updating the counter information. On the other hand, if it is determined that the high speed storage 5b of the logged-in device (MFP 10a) does not have the counter information about the login user of the MFP 10a registered (stored) therein, the procedure proceeds to step S13.

FIG. 7 illustrates the conditions of storage (storage conditions) of counter information about users of each MFP 10. As illustrated in FIG. 7, the MFP 10a currently stores counter information about five users (users U1, U2, U4, U6, and U9). Note that each MFP 10 holds the storage conditions of counter information about itself and does not hold the storage conditions of counter information about the other devices (as a rule). For example, the MFP 10a holds the storage conditions of counter information about the MFP 10a, but does not hold the storage conditions of counter information about the other devices (MFPs 10b, 10c, and so on).

For example, if the user U1 has logged in to the MFP 10a, it is determined in step S11 whether the MFP 10a has the counter information about the login user U1 of the MFP 10a (see also FIG. 7), and the procedure proceeds to step S12.

In step S12, processing for updating the counter information about the login user (here, user U1) is performed.

More specifically, for example when the user U1 has used the MFP 10a to execute a print job, the counter-information management unit 14 of the MFP 10a updates the counter information about the user U1 of the MFP 10a in accordance with the number of sheets printed out in the print job. To be more specific, a value for the number of sheets (e.g., 50 sheets) printed out in the print job by the user U1 is added to a counter value for the number of printed sheets, which is included in the counter information about the user U1 of the MFP 10a.

On the other hand, for example when the user U5 has logged in to the MFP 10a, it is determined in step S11 that the MFP 10a does not have the counter information about the login user U5 of the MFP 10a (see also FIG. 7), and the procedure proceeds to step S13.

In step S13, the counter-information management unit 14 of the logged-in device (here, MFP 10a) determines whether the login user is a user whose counter information about the logged-in device (MFP 10a) has ever been shifted from the logged-in device to another MFP 10. The content of processing in step S13 will be described later along with processing for acquiring counter information (step S14). In the present example, the login user U5 is a user who has logged in to the MFP 10a for the first time. Thus, it is determined in step S13 that "the login by the user U5 is not a login by a user whose counter information about the MFP 10a has ever been shifted to another MFP 10," and the procedure proceeds to step S15 (S15A).

In step S15 (S15A) onward, processing such as registering counter information (steps S16 and S20) is performed.

In step S15 (S15A), the counter-information management unit 14 of the logged-in device (here, MFP 10a) determines whether it is possible to register (store) counter information about the login user, depending on whether the following condition is satisfied, i.e., the available space of the high speed storage 5b is less than a predetermined capacity when the user has logged in to the device. The predetermined capacity may be a capacity (e.g., 10 kilobytes) that is necessary to store counter information about a single user, or may be a capacity (e.g., 30 kilobytes) that is necessary to store counter information about a few (e.g., three) users.

If the available space of the high speed storage 5b of the MFP 10a is more than the predetermined capacity when the user U5 has logged in to the MFP 10a, the counter-information management unit 14 of the MFP 10a determines in step S15 (S15A) that it is possible to register the counter information about the login user U5 in the logged-in device. Then, the procedure proceeds to step S16.

In step S16, the counter-information management unit 14 of the logged-in device (here, MFP 10a) registers (stores) the counter information about the login user in the high speed storage 5b of the logged-in device (MFP 10a). For example, the counter information about the user U5 of the MFP 10a (user who has logged in to the MFP 10a for the first time) is newly registered in the high speed storage 5b of the MFP 10a. Then, the processing for updating the counter information about the login user (user U5) of the MFP 10a is performed in response to execution of a job by the login user (user U5) (step S12).

On the other hand, if the available space of the high speed storage 5b of the MFP 10a is less than the predetermined capacity when the user U5 has logged in to the MFP 10a, the counter-information management unit 14 of the MFP 10a determines in step S15 (S15A) that it is not possible to register (store) the counter information about the login user U5 in the logged-in device (MFP 10a). The procedure then proceeds to step S17, and processing for shifting counter information about a specific user is performed (step S19). Note that when an inequality showing the magnitude relation of the available space of the high speed storage 5b and the predetermined capacity is satisfied, the determination result in step S15 (S15A) may be either that it is possible to register the counter information of the login user, or that it is not possible to register the counter information of the login user.

In steps S17 to S20, the processing for shifting counter information about a specific user to another MFP 10 different from the logged-in device (here, MFP 10a) is performed (step S19), and then counter information about the login user is registered (stored) in the high speed storage 5b of the logged-in device (MFP 10a) (step S20). More specifically, the logged-in device (here, MFP 10a) shifts the counter information about a specific user (specific counter information) to another MFP 10, the specific counter information being selected from among the counter information about multiple users (multiple pieces of counter information) stored in the high speed storage 5b of the logged-in device (steps S17 to S19), and then stores the counter information about the login user in itself (step S20).

First, the counter information of which user is to be shifted to another MFP 10 is determined in step S17. That is, a user (shift target user) whose counter information is to be shifted is determined in step S17.

Figure 12:
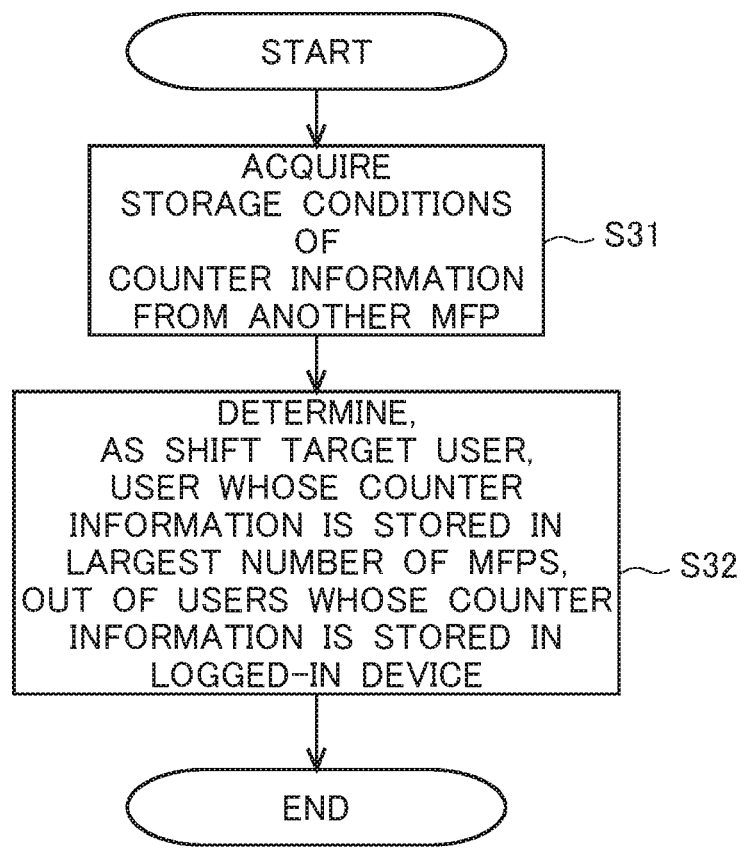
FIG. 12 illustrates a flowchart of processing for determining a shift target user.

More specifically, a user whose counter information is also stored in another or other MFPs 10 different from the logged-in device (here, MFP 10a) is determined as a shift target user whose counter information is to be shifted, from among the users whose counter information is stored in the logged-in device (MFP 10a). FIG. 12 illustrates subroutine processing performed in the processing for determining a shift target user (step S17).

To be more specific, the counter-information management unit 14 of the logged-in device (here, MFP 10a) acquires the storage conditions (storage information) of counter information from the other MFPs 10 (MFPs 10b, 10c, 10d, and so on) in the image forming system 1 (step S31). More specifically, the MFP 10a transmits, to the other MFPs 10, user identification information (e.g., user IDs) about multiple users (here, users U1, U2, U4, U6, and U9) whose counter information is stored in the MFP 10a to make inquiry about the presence or absence of counter information about each user in each MFP 10. Upon receipt of the inquiry from the MFP 10a, the other MFPs 10 each check for the storage conditions of counter information about the queried users (here, users U1, U2, U4, U6, and U9) and transmit the storage information to the MFP 10a. For example, the MFP 10b checks for the storage conditions of counter information about the queried users (users U1, U2, U4, U6, and U9) in the MFP 10b (see also FIG. 7) and transmits to the MFP 10a the storage information indicating that the counter information about the users U2, U6, and U9 (counter information made for the MFP 10b) is stored in the MFP 10b. In this way, the counter-information management unit 14 of the MFP 10a acquires the storage conditions of counter information about the queried users (users U1, U2, U4, U6, and U9) in the other MFPs 10 (MFPs 10b, 10c, 10d, and so on).

In the present example, the counter information about the user U1 is stored in only the MFP 10a and not stored in the other MFPs 10 as illustrated in FIG. 7. The counter information about the user U2 is stored in two MFPs 10, namely MFPs 10a and 10b, and the counter information about the user U4 is stored in two MFPs 10, namely MFPs 10a and 10c. The counter information about the user U6 is stored in three MFPs 10, namely MFPs 10a, 10b, and 10e, and the counter information about the user U9 is stored in five MFPs 10, namely MFPs 10a, 10b, 10c, 10d, and 10e.

Then, the counter-information management unit 14 of the logged-in device (here, MFP 10a) determines a user whose counter information is also stored in another or other MFPs 10, out of the users whose counter information is stored in the logged-in device (MFP 10a), as a shift target user whose counter information is to be shifted (step S32). More specifically, the counter-information management unit 14 of the logged-in device (MFP 10a) determines a user whose counter information is stored in a largest number of MFPs 10, out of the users whose counter information is stored in the logged-in device (MFP 10a), as a shift target user whose counter information is to be shifted. In the present example, the user U9 whose counter information is stored in the five MFPs 10 (MFPs 10a, 10b, 10c, 10d, and 10e) is determined as the shift target user. In the case where the counter information about every user stored in the logged-in device (MFP 10a) is stored in only the logged-in device (MFP 10a) (in other words, not stored in the other MFPs 10), any of the users may be determined as the shift target user.

Next, an MFP 10 to which the specific counter information is to be shifted is determined in step S18. That is, a shift destination device to which the counter information is to be shifted is determined in step S18.

More specifically, an MFP 10 that has the largest available space out of the multiple MFPs 10 (the other MFPs 10 different from the logged-in device; in the present example, MFP 10a) is determined as the shift destination device to which the counter information is to be shifted.

To be more specific, the counter-information management unit 14 of the logged-in device (here, MFP 10a) inquires of the others MFPs 10 (MFPs 10b, 10c, 10d, and so on) in the image forming system 1 about the available space of the high speed storage 5b, and acquires the available spaces of the other MFPs 10.

FIG. 8 illustrates the available spaces (remaining registerable number of users) of the high speed storages 5b of the other MFPs 10 (to be more specific, areas of the high speed storages 5b that are allocated as areas for storing the counter information). In the present example, the available space of the high speed storage 5b of the MFP 10b has a capacity (e.g., 20 kilobytes (KB)) that can register counter information about two more users, and the available space of the high speed storage 5b of the MFP 10c has a capacity (e.g., 300 KB) that can register counter information about 30 more users. The available space of the high speed storage 5b of the MFP 10d has a capacity (e.g., 220 KB) that can register counter information about 22 more users, and the available space of the high speed storage 5b of the MFP 10e has a capacity (e.g., 190 KB) that can register counter information about 19 more users.

The counter-information management unit 14 of the logged-in device (MFP 10a) determines the MFP 10 that has the largest available space out of the multiple MFPs 10 (other MFPs 10) as a shift destination device to which the counter information is to be shifted. In the present example, the MFP 10*c* having the largest available space (i.e., capable of registering counter information about 30 more users in its high speed storage 5*b*) is determined as a shift destination device to which the specific counter information (here, counter information about the user U9) is to be shifted.

Figure 4:
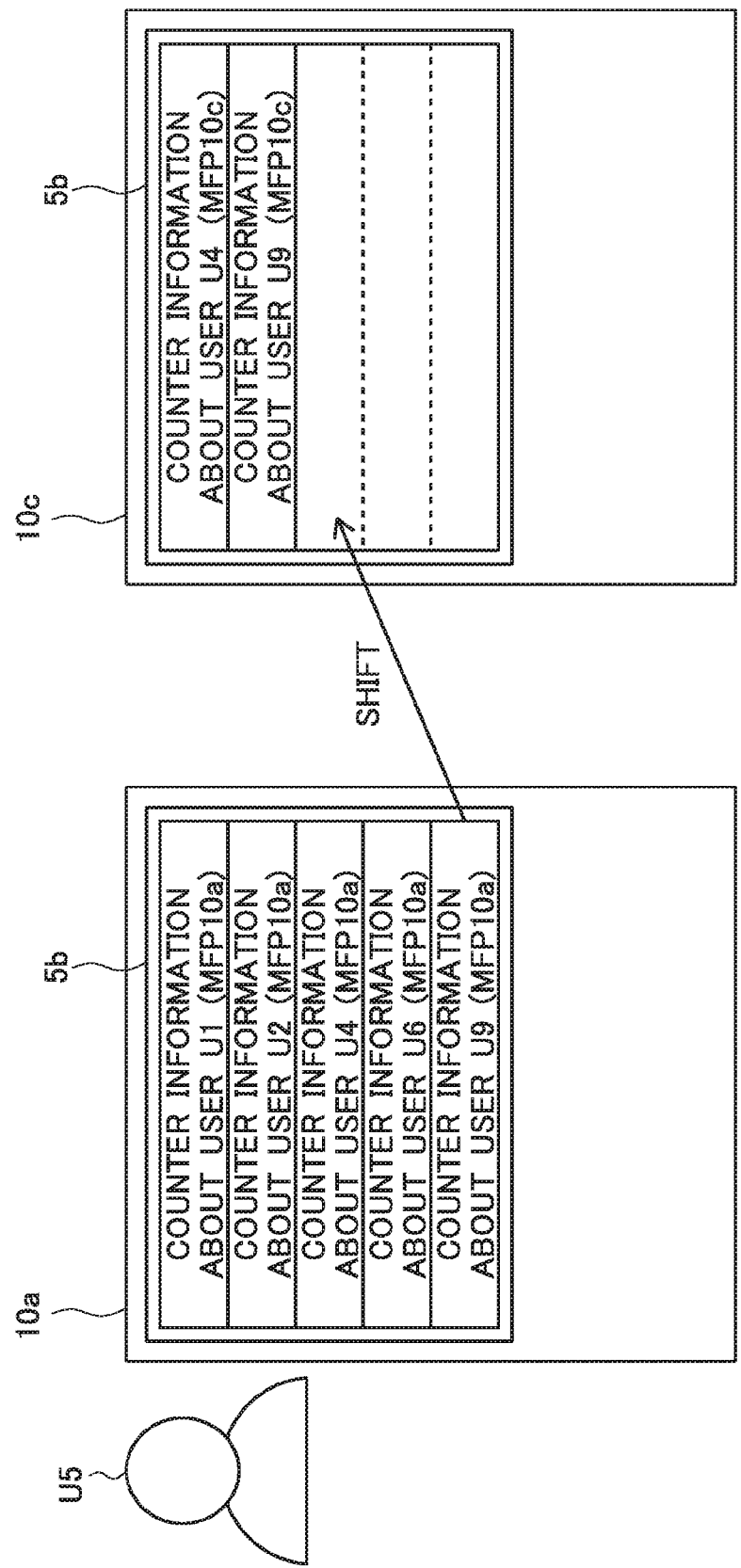
FIG. 4 illustrates the concept of shifting counter information (before shifting).
Figure 5:
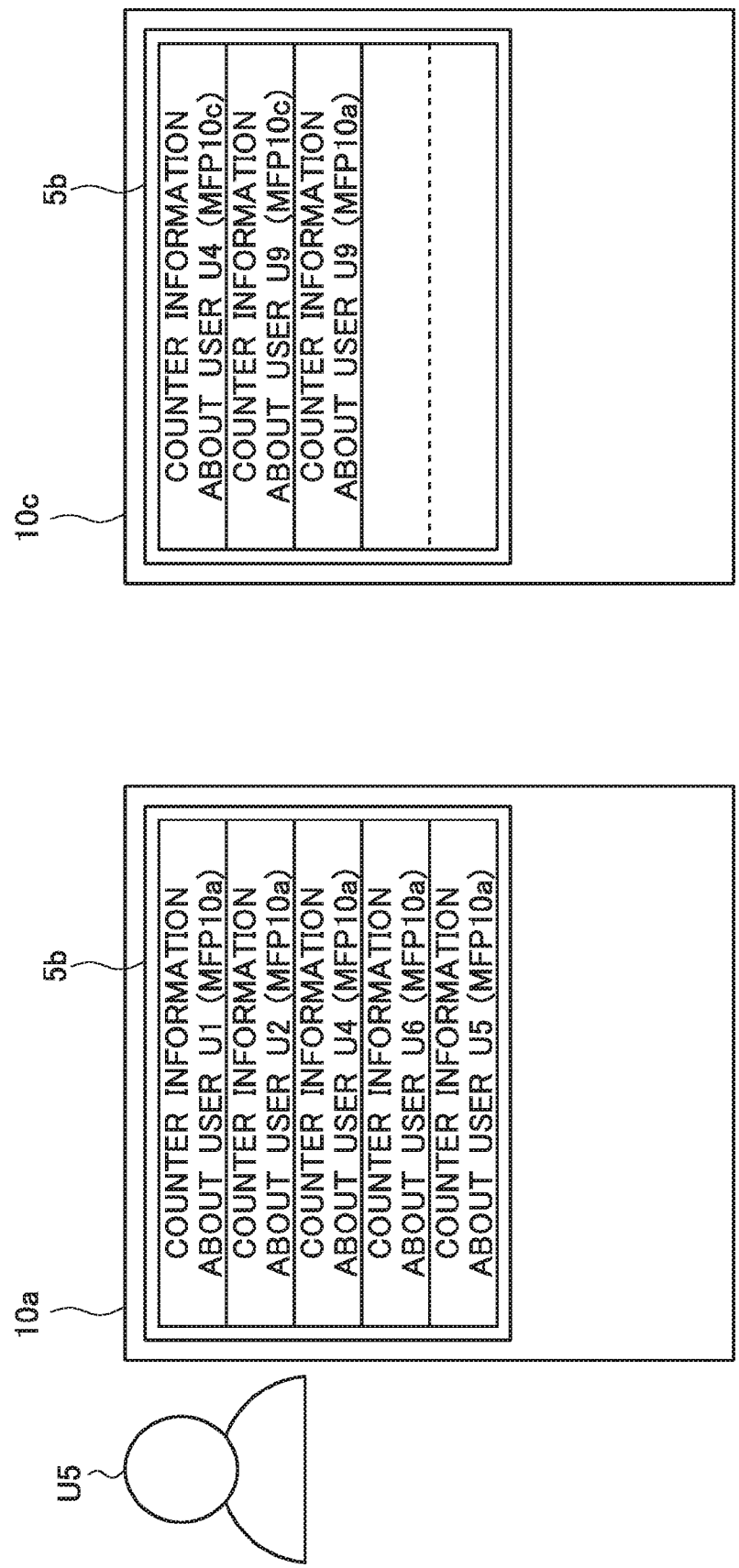
FIG. 5 illustrates the concept of shifting counter information (after shifting).

After the shift target user and the shift destination device have been determined (steps S17 and S18), the counter-information management unit 14 of the logged-in device (here, MFP 10*a*) shifts the counter information about the user (here, user U9) determined as the shift target user, to the MFP 10 (here, MFP 10*c*) determined as the shift destination device (step S19) (see also FIG. 4). More specifically, the communication control unit 11 of the logged-in device (MFP 10*a*) transmits the counter information about the shift target user (user U9) to the shift destination device (MFP 10*c*) on the basis of an instruction from the counter-information management unit 14. When shifting the counter information about the shift target user, the counter-information management unit 14 of the MFP 10*a* stores the MFP 10 (here, MFP 10*c*) determined as the shift destination device to which the counter information is shifted, in the high speed storage 5*b* (or HDD 5*a*).

FIG. 9 illustrates the storage conditions of counter information about users in each MFP 10 (storage conditions after shift processing). As a result of the counter information about the user U9 of the MFP 10*a* having been shifted from the MFP 10*a* to the MFP 10*c* (step S19), the MFP 10*c* also stores the counter information about the user U9 of the MFP 10*a*, in addition to the counter information about the user U9 of the MFP 10*c*, as illustrated in FIG. 9 (see also FIG. 5).

In step S20, the counter-information management unit 14 of the logged-in device (here, MFP 10*a*) registers the counter information about the login user in the high speed storage 5*b* of the logged-in device (MFP 10*a*). For example, the counter information about the user U5 of the MFP 10*a* (user who has logged in to the MFP 10*a* for the first time) is newly registered in the high speed storage 5*b* of the MFP 10*a* (see also FIG. 9). Thereafter, the procedure proceeds to step S12, in which the processing for updating the counter information about the login user (user U5) of the logged-in device (MFP 10*a*) is performed.

In this way, the logged-in device registers the counter information about a user in its high speed storage 5*b* as a rule (until the predetermined condition is satisfied) (step S16), and when the predetermined condition is satisfied, shifts the counter information about a specific user, out of multiple pieces of counter information stored in itself, to another MFP 10 (step S19). Then, the logged-in device registers the counter information about the current login user in its high speed storage 5*b* (step S20). In short, the logged-in device registers the counter information directly in itself while it is possible to register the counter information in itself. Then, if it becomes impossible to register the counter information about the current login user in itself due to the limited capacity of the high speed storage 5*b*, the logged-in device generates available space by shifting the counter information about a specific user to another MFP 10 and registers the counter information about the login user in the generated available space of the high speed storage 5*b*.

Referring back to the description of step S13, processing such as acquiring counter information (step S14) will now be described.

A case is assumed here in which the user U9 logs in to the MFP 10*a* and (again) uses the MFP 10*a* after execution of the above processing for shifting the counter information (step S19).

The counter information about the login user U9 is currently not registered (stored) in the logged-in device (here, MFP 10*a*) (see also FIG. 9), and the procedure proceeds from step S11 to step S13.

In step S13, it is determined whether the login user is a user whose counter information has ever been shifted from the logged-in device (here, MFP 10*a*) to another MFP 10. In other words, it is determined whether the counter information about the login user of the logged-in device (MFP 10*a*) has ever been shifted from the high speed storage 5*b* of the logged-in device (MFP 10*a*) to another MFP 10.

If it is determined in step S13 that the counter information about the login user of the logged-in device (MFP 10*a*) has not ever been shifted to another MFP 10, the procedure proceeds to step S15 (S15A), in which the aforementioned processing for registering the counter information (steps S16 and S20) is performed. On the other hand, if it is determined in step S13 that the counter information about the login user of the logged-in device (MFP 10*a*) has ever been shifted to another MFP 10, the procedure proceeds to step S14.

In the present example, the user U9 is a user determined as the shift target user whose counter information is to be shifted, in the aforementioned processing for shifting the counter information (steps S17 to S19), and the counter information about the user U9 has been shifted to another MFP 10 (here, MFP 10*c*) different from the MFP 10*a* (see also FIG. 9). Thus, it is determined in step S13 that the counter information about the login user U9 has ever been shifted from the MFP 10*a* to another MFP 10, and the procedure proceeds to step S14.

In step S14, the logged-in device (here, MFP 10*a*) to be used again by the login user (here, user U9) acquires the counter information about the login user (counter information made for the logged-in device) that has been shifted to another MFP 10, from the shift destination MFP 10.

More specifically, the communication control unit 11 of the logged-in device (MFP 10*a*) transmits a request to return the counter information about the login user (user U9) of the MFP 10*a*, to the MFP 10 (here, MFP 10*c*) determined as the shift destination device to which the counter information about the user U9 is shifted. As described above, in the case of shifting the counter information about the user U9 (step S19), the logged-in device (MFP 10*a*) stores the MFP 10 (MFP 10*c*) determined as the shift destination device to which the counter information about the user U9 is shifted.

In response to the return request from the MFP 10*a*, the shift destination device (MFP 10*c*) transmits the counter information about the user U9 (to be more specific, counter information about the user U9 of the MFP 10*a*) stored in the high speed storage 5*b* of the shift destination device (MFP 10*c*) to the MFP 10*a* (see also FIG. 9).

Then, the MFP 10*a* acquires (receives) the counter information about the user U9 (counter information about the user U9 of the MFP 10*a*) transmitted from the MFP 10*c* (step S14).

Thereafter, the procedure proceeds to step S15 and onward, and the processing for registering (storing) the counter information about the login user (here, user U9) is performed.

For example, if it is determined in step S15 that it is possible to register the counter information about the login user U9 in the high speed storage 5*b* of the MFP 10*a*, the counter information about the user U9 is registered (re-registered) in the high speed storage 5*b* of the MFP 10*a* (step S16).

On the other hand, if it is determined in step S15 that it is not possible to register the counter information about the login user U9 in the high speed storage 5b of the MFP 10a, the processing for shifting counter information (step S19) is performed (again). More specifically, specific counter information (counter information about a specific user) out of multiple pieces of counter information stored in the high speed storage 5b of the MFP 10a is shifted to another MFP 10 (steps S17 to S19). Then, the counter information about the login user U9 is registered (re-registered) in the MFP 10a (step S20).

As described above, in the operations described in the first embodiment, counter information about a login user is registered directly in the high speed storage 5b of an MFP 10 (until the predetermined condition is satisfied) (step S16). Each MFP 10 basically registers counter information about an upper limit number of users in itself and manages the usage of itself by multiple users, by using the counter information about the multiple users registered therein. This eliminates the need for the MFPs 10 when used by login users to always perform processing for acquiring counter information about the login users from a single specific MFP 10. As a result, access concentration from each MFP 10 is less likely to occur in the specific MFP 10. It is thus possible to manage the usage of the MFPs 10 by users while suppressing a decrease in the convenience of users due to the access concentration.

If the predetermined condition is satisfied (if it becomes impossible for an MFP 10 to register the counter information about a login user in its high speed storage 5b due to the limited capacity of the high speed storage 5b), specific counter information out of multiple pieces of counter information stored in the high speed storage 5b is shifted to another MFP 10 (step S19). In other words, if it becomes impossible for an MFP 10 to register the counter information about a login user in its high speed storage 5b, the MFP 10 generates available space in the high speed storage 5b by shifting counter information about a specific user to another MFP 10 so that the counter information about the login user can be registered in the high speed storage 5b, and registers the counter information about the login user in the generated available space of the high speed storage 5b. As a result, the MFP 10 can manage the usage by a larger number of users than the number of users registerable in its high speed storage 5b (i.e., an upper limit number based on the limited capacity). That is, each MFP 10 can make efficient use of its high speed storage 5b, irrespective of the limited capacity of the high speed storage 5b. The efficient use of the high speed storages 5b of the MFPs 10 eliminates the need to provide each MFP 10 with a relatively large-capacity high speed storage 5b. It is thus possible to manage the usage of the MFPs 10 by users while suppressing an increase in cost.

Moreover, when the specific user again uses the logged-in device, the specific counter information (counter information about the specific user) shifted from the logged-in device to the shift destination MFP 10 is acquired from the shift destination MFP 10 (step S14). That is, the logged-in device gets the shifted counter information about the login user, which has been shifted to another MFP 10, back to itself and then performs the processing for updating the counter information about the login user. It is thus possible to properly manage the usage of the MFPs 10 by users.

It is to be noted here that if the processing for acquiring counter information from another MFP 10 (step S14) is performed at high frequency, large amounts of time may be required to acquire the counter information and accordingly the convenience of users may decrease.

In view of this, in the embodiment described above, a user whose counter information is also stored in another or other MFPs 10, out of the users whose counter information is stored in the logged-in device (e.g., MFP 10a), is preferentially determined as a shift target user whose counter information is to be shifted (step S17). In other words, a user who uses only a certain MFP (e.g., MFP 10a) (i.e., user who does not use other MFPs 10; in the present example, user U1) (see also FIG. 7) is less likely to be determined as a shift target user whose counter information is to be shifted. That is, the counter information about a user (user U1) who is more likely to use the same MFP 10 (e.g., MFP 10a) next time as he or she used previously is less likely to be shifted to another MFP 10. This reduces the frequency of occurrence of the processing for acquiring counter information from another MFP 10 (step S14) and suppresses a decrease in the convenience of users.

In the embodiment described above, a user whose counter information is stored in the largest number of MFPs 10, out of the users whose counter information is stored in the logged-in device (e.g., MFP 10a), is determined as a shift target user whose counter information is to be shifted (step S17). That is, the user who is most likely to use the other MFPs 10 different from the logged-in device (in other words, user who is least likely to use the logged-in device) is determined as the shift target user whose counter information is to be shifted. This reduces the frequency of occurrence of the processing for acquiring counter information from another MFP 10 (step S14) and suppresses a decrease in the convenience of users.

While the first embodiment takes the example of the mode in which a request to return the specific counter information (counter information about a specific user of the logged-in device) shifted to the shift destination MFP 10 is directly transmitted to the shift destination MFP 10 to acquire the specific counter information (step S14), the present invention is not limited to this example. For example, a mode is also possible in which user identification information about a specific user and device identification information about a logged-in device are transmitted to all multiple MFPs 10, and the specific counter information (counter information about the specific user of the logged-in device) is acquired from one MFP 10 (i.e., shift destination device) out of the multiple MFPs 10.

More specifically, in step S14, the logged-in device (e.g., MFP 10a) transmits user identification information (e.g., user ID) about a specific user (e.g., user U9) and device identification information (e.g., device ID) about itself to all other MFPs 10 (multiple MFPs 10 other than the logged-in device (MFP 10a); MFPs 10b, 10c, 10d, and so on).

The other MFPs 10 (MFPs 10b, 10c, 10d, and so on) each check for the presence or absence of counter information about the user U9 of the MFP 10a, on the basis of the user identification information (user ID of the user U9) and the device identification information (device ID of the MFP 10a) that are received from the MFP 10a. One MFP 10 (e.g., MFP 10c) out of the multiple MFPs 10 identifies the counter information about the user U9 on the basis of the user identification information (user ID of the user U9) and identifies the counter information made for the MFP 10a on the basis of the device identification information about the MFP 10a. The MFP 10c then transmits the counter information about the specific user (user U9) of the MFP 10a to the MFP 10a.

The logged-in device (MFP 10a) receives (acquires) the counter information about the specific user (user U9) of itself (MFP 10a) from this one MFP 10 (MFP 10e) (step S14).

In this way, the user identification information about the specific user and the device identification information about the logged-in device may be transmitted to all other MFPs 10, and the counter information about the specific user of the logged-in device may be acquired from one MFP 10 out of the multiple MFPs 10.

While the first embodiment takes the example of the mode in which the shift destination device is determined (step S18) after determination of the shift target user (step S17), the present invention is not limited to this example. Alternatively, the shift target user may be determined after determination of the shift destination device. That is, the processing for determining the shift destination device does not rely on the shift target user, and the processing for determining the shift target user does not rely on the shift destination device.

2. Second Embodiment

A second embodiment is a variation of the first embodiment. The following description focuses on differences from the first embodiment.

In the second embodiment, the processing illustrated in FIG. 6 is performed in the same manner as in the first embodiment. The second embodiment, however, differs in the content of processing in step S17 from the first embodiment.

More specifically, in step S17 described in the first embodiment, a user whose counter information is also stored in another or other MFPs 10, out of the users whose counter information is stored in the logged-in device (e.g., MFP 10a), is determined as the shift target user whose counter information is to be shifted.

In contrast to this, in step S17 according to the second embodiment, a user who is least likely to use the logged-in device (MFP 10a), out of the users whose counter information is stored in the logged-in device (e.g., MFP 10a), is determined as the shift target user whose counter information is to be shifted.

FIG. 10 illustrates an example showing the frequencies of use of the MFPs 10 by each user. In the present example, the number of logins to each MFP 10 is used as the frequency of use of the MFP 10.

As illustrated in FIG. 10, the frequency of use of (here, the number of logins to) the MFP 10a by the user U1 is 50 times, and the frequency of use of the MFP 10a by the user U2 is 12 times. The frequency of use of the MFP 10a by the user U4 is nine times, the frequency of use of the MFP 10a by the user U6 is two times, and the frequency of use of the MFP 10a by the user U9 is 17 times.

Thus, the counter-information management unit 14 of the logged-in device (here, MFP 10a) determines the user U6 who is least likely to use the MFP 10a, out of the users U1, U2, U4, U6, and U9 whose counter information is stored in the MFP 10a, as a shift target user whose counter information is to be shifted (step S17).

The processing other than step S17 is performed in the same manner as described in the first embodiment.

For example, the counter information about the user (user U6) determined as the shift target user is shifted to the MFP 10 determined as the shift destination device (steps S18 and S19), and the counter information about a login user (e.g., user U5) is registered (stored) in the logged-in device (MFP 10a) (step S20).

In this mode according to the second embodiment, a user who is less likely to use the logged-in device (e.g., MFP 10a), out of the users whose counter information is stored in the logged-in device (MFP 10a), is determined as the shift target user whose counter information is to be shifted. In short, the logged-in device shifts the counter information about a user who is determined to be least likely to use the logged-in device, to another MFP 10. This reduces the frequency of occurrence of the processing for acquiring counter information from another MFP 10 (step S14) and suppresses a decrease in the convenience of users.

While the second embodiment takes the example of the mode in which the number of logins to an MFP 10 is used as the frequency of use of the MFP 10, the present invention is not limited to this example. For example, the number of sheets printed out in a print job executed by an MFP 10 may be used as the frequency of use of the MFP 10, or the number of sheets scanned in a scan job executed by an MFP 10 may be used as the frequency of use of the MFP 10. As another alternative, these elements may be combined to form an index value, and this index value may be used to determine the frequency of use of the MFP 10.

3. Third Embodiment

A third embodiment is a variation of the first and second embodiments. The following description focuses on differences from the first and second embodiments.

In the third embodiment, the processing illustrated in FIG. 6 is performed in the same manner as in the first and second embodiments. The third embodiment, however, differs in the content of processing in step S18 from the first and second embodiments.

More specifically, in step S18 described in the first and second embodiments, an MFP 10 that has the largest available space out of the multiple MFPs 10 is determined as the shift destination device whose counter information is to be shifted.

In contrast to this, in step S18 according to the third embodiment, a specific MFP 10 at a higher level than the logged-in device is determined as the shift destination device whose counter information is to be shifted.

Figure 11:
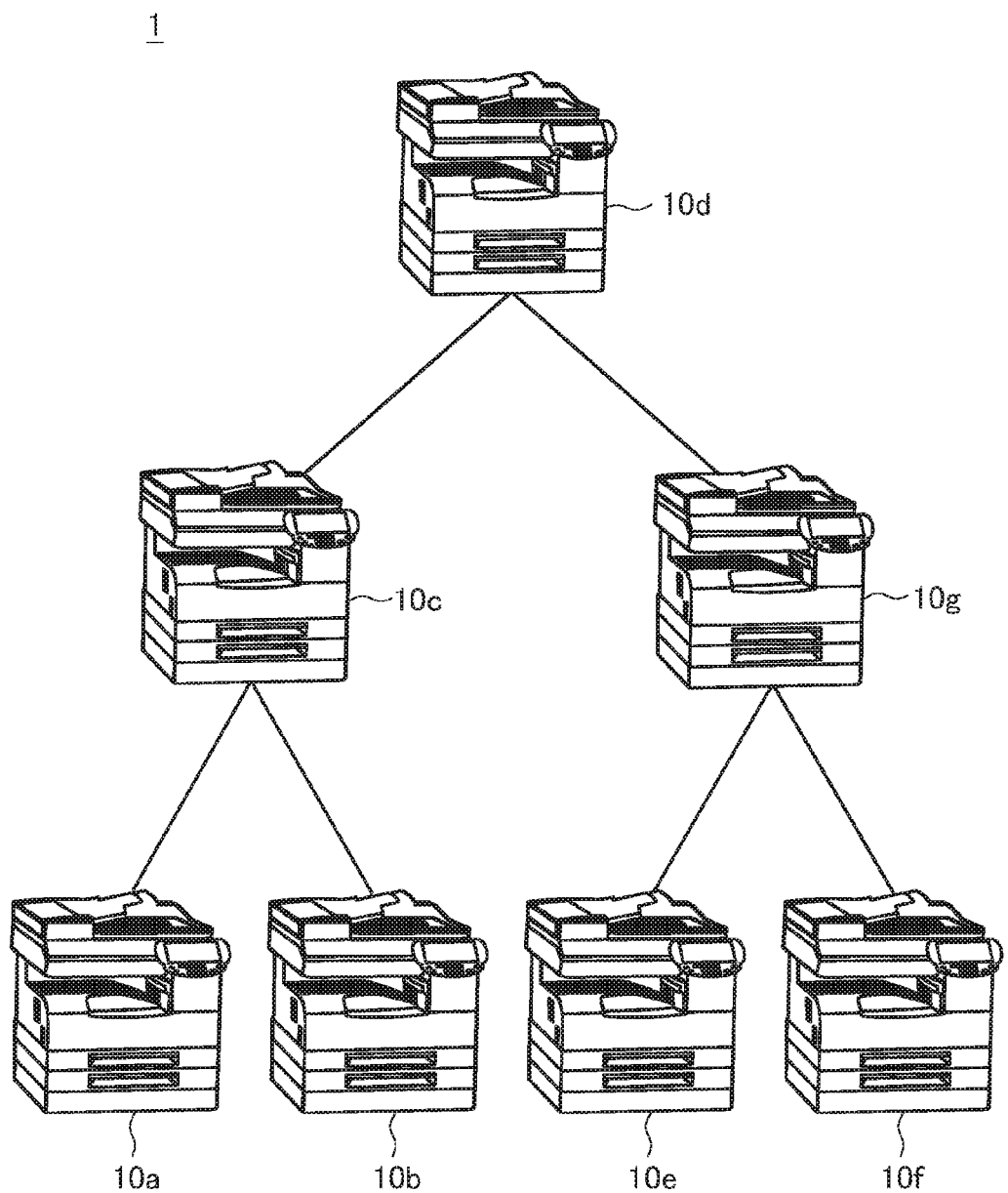
FIG. 11 illustrates a system configuration of an image forming system according to a third embodiment.

FIG. 11 illustrates a system configuration of the image forming system 1 according to the third embodiment.

As illustrated in FIG. 11, in the image forming system 1 of the third embodiment, multiple MFPs 10 are organized into a multilevel (multilayer) hierarchy and logically connected to one another. In the present example, an MFP 10d is a device at the top level of the hierarchical structure, and MFPs 10c and 10g are devices at one level lower than (immediately below) the MFP 10d (i.e., slave devices of the MFP 10d). MFPs 10a and 10b are devices at one level lower than the MFP 10c (i.e., slave devices of the MFP 10c), and MFPs 10e and 10f are devices at one level lower than the MFP 10g (i.e., slave devices of the MFP 10g). The hierarchical structure (master-slave relationship of the multiple MFPs 10) in the image forming system 1 is set (constructed) in advance by, for example, a system administrator. The master MFPs 10 are preferably equipped with relatively large-capacity high speed storages 5b (as compared with the high speed storages 5b of the slave MFPs 10).

In step S18 of the third embodiment, the counter-information management unit 14 of the logged-in device (e.g., MFP 10a) determines a specific MFP 10 at a higher level than itself (MFP 10a), out of the multiple MFPs 10, as the shift destination device whose counter information is to be shifted. In the present example, the MFP 10 at the top level (here, MFP 10d) out of the multiple MFPs 10 is determined as the shift destination device whose counter information is to be shifted.

The processing other than step S18 is performed in the same manner as in the first and second embodiments.

For example, the counter information about a specific user is shifted to the MFP 10 determined as the shift destination device (MFP 10 at the top level; in the present example, MFP 10*d*) (step S19), and the counter information about a login user is registered (stored) in the logged-in device (here, MFP 10*a*) (step S20).

This mode achieves similar effects to those of the first and second embodiments.

In the third embodiment, a specific MFP 10 at a higher level than the logged-in device is determined as the shift destination device whose counter information is to be shifted. In other words, a specific MPF 10 is fixedly determined as the shift destination device whose counter information is to be shifted. This eliminates the need for the logged-in device to inquire of the other MFPs 10 about the available space of the MFPs 10 when performing the processing for determining the shift destination device as in the first embodiment. It is thus possible to suppress, for example, an increase in communication load between the logged-in device and the other MFPs 10 due to an inquiry about available space made to the other MFPs 10.

While the third embodiment takes the example of the mode in which the MFP 10 (here, MFP 10*d*) at the top level, out of the MFPs 10 at higher levels than the logged-in device (e.g., MFP 10*a*), is determined as the shift destination device whose counter information is to be shifted, the present invention is not limited to this example. For example, an MFP 10 (i.e., master device; in the present example, MFP 10*c* in FIG. 11) at one level higher than (immediately above) the logged-in device (MFP 10*a*), out of the MFPs 10 at higher levels than the logged-in device (MFP 10*a*), may be determined as the shift destination device whose counter information is to be shifted.

4. Variations

While the above has been a description of embodiments of the present invention, the present invention is not intended to be limited to the examples described above.

For example, each embodiment described above takes the example of the mode in which the determination in step S15 (FIG. 6) as to whether it is possible to register the counter information about the login user is made depending on whether, when the user has logged in to the MFP 10 (logged-in device), the available space of the high speed storage 5*b* is less than the predetermined capacity. However, the present invention is not limited to this example.

Figure 13:
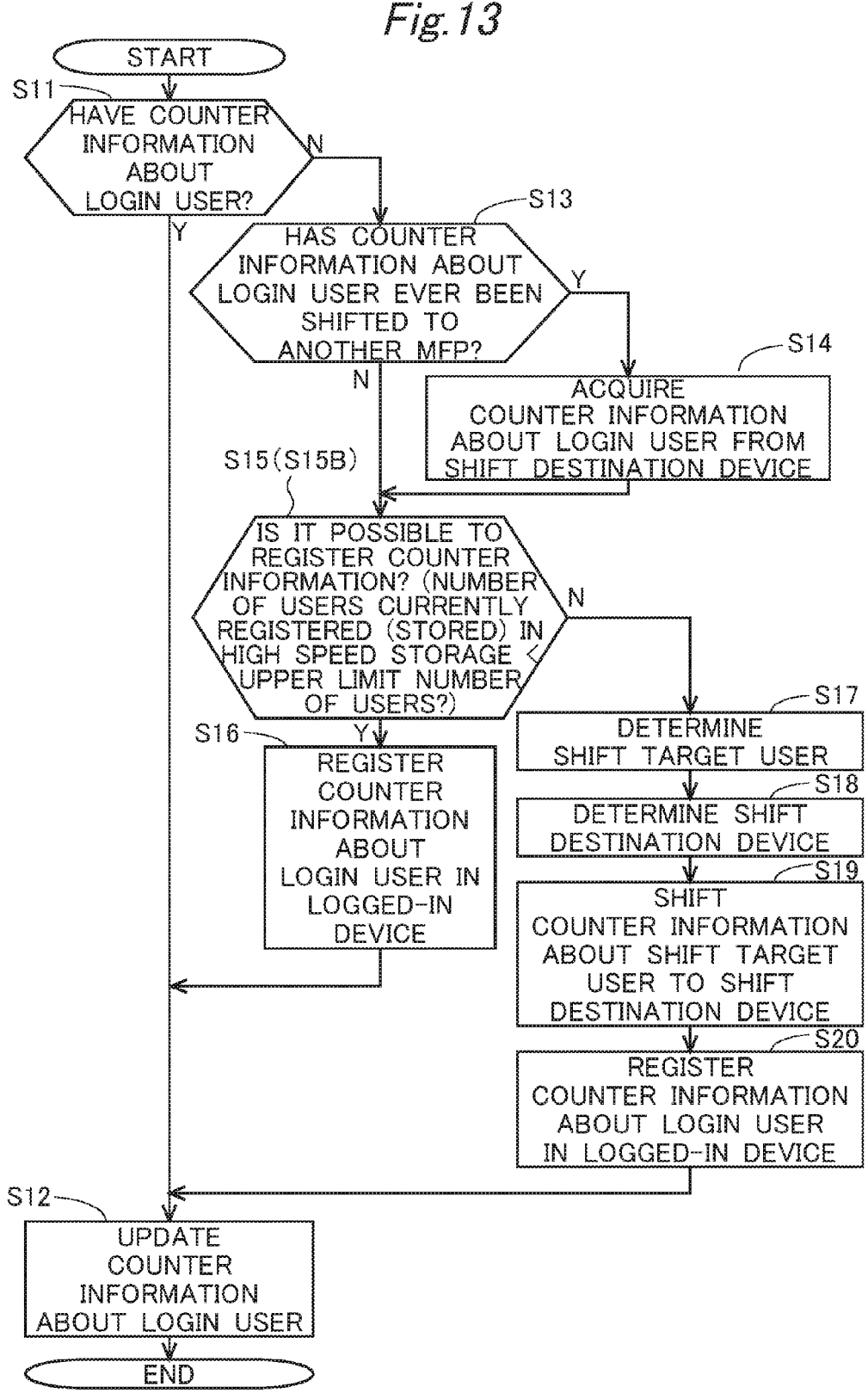
FIG. 13 illustrates a flowchart of operations performed by an MFP according to a variation.

More specifically, the determination in step S15 as to whether it is possible to register the counter information about the login user may be made depending on whether, when the user has logged in to the MFP 10 (logged-in device), the number of users currently registered (stored) in the high speed storage 5*b* has reached a predetermined registerable number of users (predetermined upper limit number of users) (see step S15B in FIG. 13). To be more specific, whether it is possible to register the counter information about the login user may be determined depending on whether, when the user has logged in to the logged-in device, the number of users whose counter information is currently stored in the high speed storage 5*b* has reached the upper limit number of (e.g., 20) users whose counter information can be stored in the high speed storage 5*b*.

For example, if the high speed storage 5*b* of the MFP 10*a* currently stores counter information about 10 users when a user (e.g., user U5) has logged in to the MFP 10*a*, it is determined that when the user U5 has logged in to the MFP 10, the number of users (here, 10 users) currently registered in the high speed storage 5*b* has not reached the registerable number of users (here, 20 users). Then, it is determined in step S15 (S15B) that it is possible to register (store) the counter information about the login user (user U5) in the high speed storage 5*b* of the MFP 10*a*, and the procedure proceeds to step S16.

On the other hand, if the high speed storage 5*b* of the MFP 10*a* stores counter information about 20 users when a user (user U5) has logged in to the MFP 10*a*, it is determined that when the user U5 has logged in to the MFP 10, the number of users (20 users) currently registered in the high speed storage 5*b* has reached the registerable number of users (20 users). If the condition is satisfied that the number of users currently registered in the high speed storage 5*b* has reached the registerable number of users, it is determined in step S15 (S15B) that it is not possible to register the counter information about the login user (user U5) in the high speed storage 5*b* of the MFP 10*a*, and the procedure proceeds to step S17.

In this way, whether it is possible to register the counter information about the login user may be determined depending on whether, when the user has logged in to the MFP 10, the number of users currently registered in the high speed storage 5*b* has reached the registerable number of users.

Each embodiment described above takes the example of the mode in which the image forming system 1 is a relatively large-scale system (e.g., system used by ten thousand users and constituted by approximately several hundreds of MFPs 10). The present invention is, however, not limited to this example, and for example, the image forming system 1 may be a relatively small-scale system (e.g., system used by approximately several tens of users and constituted by a few MFPs 10).

More specifically, for example in the image forming system 1 constituted by two MFPs 10 (10*a* and 10*b*), if one of the MFPs 10 (e.g., MFP 10*a*) satisfies a predetermined condition, specific counter information out of multiple pieces of counter information stored in the MFP 10 (MFP 10*a*) is shifted to the other MFP 10 (here, MFP 10*b*) (step S19). Then, counter information about a login user is stored in the high speed storage 5*b* of the one MFP 10 (MFP 10*a*) (step S20).

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus configured to exchange various types of information with at least one image forming apparatus, comprising:
   a first nonvolatile storage unit and a second nonvolatile storage unit that is a hard disk drive, the first nonvolatile storage unit configured to enable access processing at a first speed that is faster than an access speed of the second nonvolatile storage unit of the image forming apparatus, and the first nonvolatile storage unit is capable of storing amount-of-use information regarding an amount of use of the image forming apparatus by each user of a plurality of users; and a hardware processor configured to manage usage of the image forming apparatus by the plurality of users, by using the amount-of-use information stored in the first nonvolatile storage unit, wherein on a predetermined condition, the hardware processor shifts specific amount-of-use information to a shift destination device that is the at least one other image forming apparatus and deletes the shifted amount-of-use information from the first nonvolatile storage unit, the specific amount-of-use information being amount-of-use information about a specific user out of the plurality of users, out of a plurality of pieces of amount-of-use information about each of the plurality of users stored in the storage unit.

2. The image forming apparatus according to claim 1, wherein
the hardware processor stores amount-of-use information about a login user in the storage unit after the specific amount-of-use information is shifted to the shift destination device.

3. The image forming apparatus according to claim 1, wherein
the predetermined condition is one of:
a condition that, when a user has logged in to the image forming apparatus, available space of the storage unit is less than a predetermined capacity; and
a condition that, when a user has logged in to the image forming apparatus, the number of users whose amount-of-use information is stored in the storage unit has reached an upper limit number of users whose amount-of-use information can be stored in the storage unit.

4. The image forming apparatus according to claim 1, wherein
the hardware processor determines, as the specific user, a user whose amount-of-use information is also stored in another image forming apparatus different from the image forming apparatus, out of users whose amount-of-use information is stored in the image forming apparatus.

5. The image forming apparatus according to claim 4, wherein
the hardware processor determines, as the specific user, a user whose amount-of-use information is stored in a largest number of image forming apparatuses, out of users whose amount-of-use information is stored in the image forming apparatus.

6. The image forming apparatus according to claim 1, wherein
the hardware processor determines, as the specific user, a user who is least likely to use the image forming apparatus, out of users whose amount-of-use information is stored in the image forming apparatus.

7. The image forming apparatus according to claim 1, wherein
the hardware processor determines, as the shift destination device, an image forming apparatus that has largest available space, out of the at least image forming apparatus.

8. The image forming apparatus according to claim 1, wherein
the hardware processor determines, as the shift destination device, a specific image forming apparatus at a higher level than the image forming apparatus, out of a plurality of image forming apparatuses that include the image forming apparatus and that are logically connected to one another to have a hierarchical structure.

9. The image forming apparatus according to claim 1, wherein
when the specific user again uses the image forming apparatus and it is determined that the specific amount-of-use information has been shifted from the storage unit of the image forming apparatus to the shift destination device, the hardware processor acquires the specific amount-of-use information from the shift destination device and stores the specific amount-of-use information again in the storage unit.

10. The image forming apparatus according to claim 9, wherein
when the specific amount-of-use information is shifted to the shift destination device, the hardware processor stores the shift destination device,
the image forming apparatus further comprising:
a communication control unit configured to, when the specific user again uses the image forming apparatus, transmit to the shift destination device a return request to return the specific amount-of-use information, and
wherein the hardware processor acquires the specific amount-of-use information transmitted from the shift destination device in response to the return request.

11. The image forming apparatus according to claim 9, further comprising:
a communication control unit configured to, when the specific user again uses the image forming apparatus, transmit user identification information about the specific user and device identification information about the image forming apparatus to the at least one image forming apparatus,
wherein the hardware processor acquires amount-of-use information about the specific user of the image forming apparatus as the specific amount-of-use information from one image forming apparatus out of the at least one image forming apparatus, the specific user being identified on the basis of the user identification information in the one image forming apparatus, and the image forming apparatus being identified on the basis of the device identification information in the one image forming apparatus.

12. An image forming system comprising:
a plurality of image forming apparatuses,
wherein one image forming apparatus out of the plurality of image forming apparatus includes:
a first nonvolatile storage unit and a second nonvolatile storage unit that is a hard disk drive, the first nonvolatile storage unit configured to enable access processing at a first speed that is faster than an access speed of the second nonvolatile storage unit of the one image forming apparatus and the first nonvolatile storage unit is capable of storing amount-of-use information regarding an amount of use of the one image forming apparatus by each user of a plurality of users; and
a hardware processor configured to manage usage of the one image forming apparatus by the plurality of users, by using the amount-of-use information stored in the first nonvolatile storage unit, and
on a predetermined condition, the hardware processor shifts specific amount-of-use information to a shift destination device that is the at least one other image forming apparatus and deletes the shifted amount-of-use information from the first nonvolatile storage unit, the specific amount-of-use information being amount-of-use information about a specific user out of the plurality of users, out of a plurality of pieces of amount-of-use information about each of the plurality of users stored in the storage unit.

13. The image forming system according to claim 12, wherein
the hardware processor stores amount-of-use information about a login user in the storage unit after the specific amount-of-use information is shifted to the shift destination device.

14. The image forming system according to claim 12, wherein
the predetermined condition is one of:
a condition that, when a user has logged in to the one image forming apparatus, available space of the storage unit is less than a predetermined capacity; and
a condition that, when a user has logged in to the one image forming apparatus, the number of users whose amount-of-use information is stored in the storage unit has reached an upper limit number of users whose amount-of-use information can be stored in the storage unit.

15. The image forming system according to claim 12, wherein
the hardware processor determines, as the specific user, a user whose amount-of-use information is also stored in another image forming apparatus different from the one image forming apparatus, out of users whose amount-of-use information is stored in the one image forming apparatus.

16. The image forming system according to claim 15, wherein
the hardware processor determines, as the specific user, a user whose amount-of-use information is stored in a largest number of image forming apparatuses, out of users whose amount-of-use information is stored in the one image forming apparatus.

17. The image forming system according to claim 12, wherein
the hardware processor determines, as the specific user, a user who is least likely to use the one image forming apparatus, out of users whose amount-of-use information is stored in the one image forming apparatus.

18. The image forming system according to claim 12, wherein
the hardware processor determines, as the shift destination device, an image forming apparatus that has largest available space, out of the plurality of image forming apparatuses.

19. The image forming system according to claim 12, wherein
the plurality of image forming apparatuses are logically connected to one another to have a hierarchical structure, and
the hardware processor determines, as the shift destination device, a specific image forming apparatus at a higher level than the one image forming apparatus, out of the plurality of image forming apparatuses.

20. The image forming system according to claim 12, wherein
when the specific user again uses the image forming apparatus and it is determined that the specific amount-of-use information has been shifted from the storage unit of the image forming apparatus to the shift destination device, the hardware processor acquires the specific amount-of-use information from the shift destination device and stores the specific amount-of-use information again in the storage unit.

21. The image forming system according to claim 20, wherein
when the specific amount-of-use information is shifted to the shift destination device, the hardware processor stores the shift destination device,
the one image forming apparatus further includes a communication control unit configured to, when the specific user again uses the one image forming apparatus, transmit to the shift destination device a return request to return the specific amount-of-use information,
the shift destination device includes a transmission unit configured to transmit the specific amount-of-use information to the one image forming apparatus in response to the return request, and
the hardware processor acquires the specific amount-of-use information transmitted from the shift destination device.

22. The image forming system according to claim 20, wherein
the one image forming apparatus further includes a communication control unit configured to, when the specific user again uses the one image forming apparatus, transmit user identification information about the specific user and device identification information about the one image forming apparatus to the plurality of image forming apparatuses excluding the one image forming apparatus,
the shift destination device includes a transmission unit configured to transmit amount-of-use information about the specific user of the one image formatting apparatus to the one image forming apparatus, the specific user being identified on the basis of the user identification information in the shift destination device, and the one image forming apparatus being identified on the basis of the device identification information in the shift destination device, and
the hardware processor acquires amount-of-use information about the specific user of the one image forming apparatus as the specific amount-of-use information from the shift destination device.

23. A non-transitory computer-readable recording medium that records a program for causing a computer that is built into an image forming apparatus configured to exchange various types of information with at least one other image forming apparatus, to execute:
a) storing amount-of-use information regarding an amount of use of the image forming apparatus by each user in nonvolatile storage unit capable of higher-speed access processing than a hard disk drive of the image forming apparatus; and
b) on a predetermined condition, shifting specific amount-of-use information to a shift destination device that is another image forming apparatus different from the image forming apparatus, the specific amount-of-use information being amount-of-use information about a specific user, out of a plurality of pieces of amount-of-use information about each of a plurality of users stored in the storage unit.

* * * * *